Figure 1:
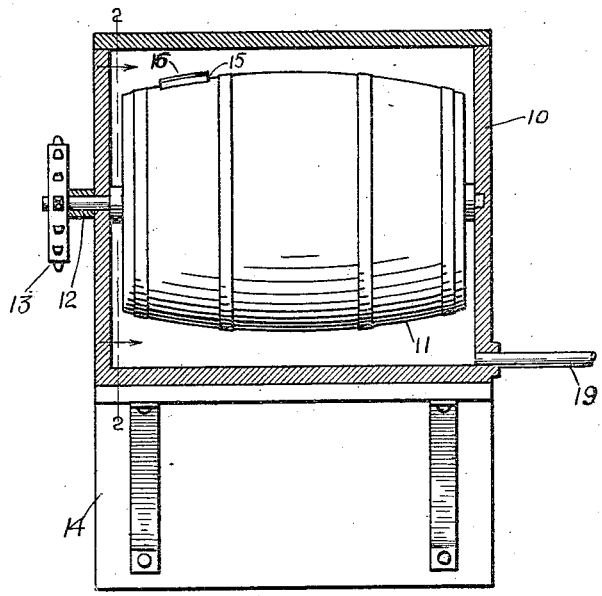

A. W. DAVIS.
MACHINE FOR MAKING BRINE.
APPLICATION FILED AUG. 15, 1910.

990,476.

Patented Apr. 25, 1911.

WITNESSES:
H. W. Meade.
S. W. Atherton.

INVENTOR
Asa W. Davis
BY
A. M. Wooster
ATTORNEY

THE NORRIS PETERS CO., WASHINGTON, D. C.

UNITED STATES PATENT OFFICE.

ASA W. DAVIS, OF DERBY, CONNECTICUT.

MACHINE FOR MAKING BRINE.

990,476.  Specification of Letters Patent.  Patented Apr. 25, 1911.

Original application filed June 2, 1909, Serial No. 499,704. Divided and this application filed August 15, 1910. Serial No. 577,382.

*To all whom it may concern:*

Be it known that I, ASA W. DAVIS, a citizen of the United States, residing at Derby, county of New Haven, State of Connecticut, have invented an Improvement in Machines for Making Brine, of which the following is a specification.

This invention relates to certain new and useful improvements in machines for making brine and is a division of the application resulting in Letters Patent 967,503, granted to me August 16, 1910, and the invention has for its object to provide a simple and inexpensive machine adapted for general use wherever a supply of cold, strong brine is required as for cold storage purposes, ice cream freezing and other freezing machines.

With these and other objects in view I have devised the novel brine making machine which I will now describe, referring to the accompanying drawing forming a part of this specification and using reference characters to indicate the several parts.

Figure 2:
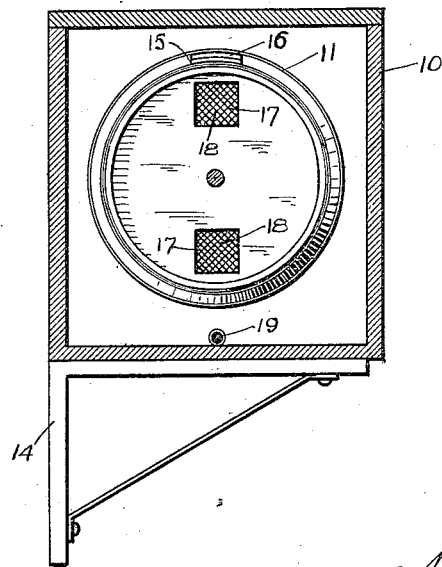

Figure 1 is a view partly in elevation and partly in section, illustrating the construction and operation of my novel machine; and Fig. 2 is a section on the line 2—2 in Fig. 1, looking in the direction of the arrows.

10 denotes a tank in which a barrel 11 is mounted to rotate. One of the journals of the barrel, indicated specifically by 12, extends through the tank and is provided with means for imparting rotation thereto, as for example a crank, or a sprocket wheel 13 over which a driving sprocket chain (not shown) passes. The tank is secured at the required elevation in any suitable manner, as for example by means of brackets 14. The barrel is provided with an opening 15 for convenience in filling it with a freezing mixture as salt and ice, said opening being provided with a cover 16 which is secured in place in any suitable manner (not shown). At the ends of the barrel are openings 17 covered on the inner side with screens 18 which retain the ice and salt therein but permit the intensely cold brine formed by the melting of the ice and salt to escape freely. The brine passes from the tank by means of a discharge pipe 19 to the point of use, as for example to an ice cream freezing machine, as in my said former application referred to, of which this application is a division.

In use, the barrel is charged with broken ice and salt and is caused to rotate. The intensely cold brine produced by the melting of the ice and salt passes from the barrel into the tank through the openings 17, the screens 18 preventing the escape of the ice and salt. From the tank the brine passes by means of pipe 19 to the point of use.

Having thus described my invention I claim:

1. A machine for making brine comprising a tank, an outlet pipe leading therefrom, and a receptacle rotatably mounted within said tank and provided with a normally closed charging opening the ends of said receptacle having openings for the escape of brine.

2. A machine for making brine comprising a closed tank provided with an outlet, a receptacle rotatably mounted within said tank and provided with a charging opening in its side and discharge openings in its ends, a cover normally closing said charging opening, and screens covering said discharge openings.

In testimony whereof I affix my signature in presence of two witnesses.

ASA W. DAVIS.

Witnesses:
JAMES F. WELCH,
JACOB BRAUN.

---

Copies of this patent may be obtained for five cents each, by addressing the "Commissioner of Patents, Washington, D. C."